March 25, 1930.  B. S. HARRINGTON  1,752,257
CARCASS SPLITTER
Filed Jan. 11, 1928
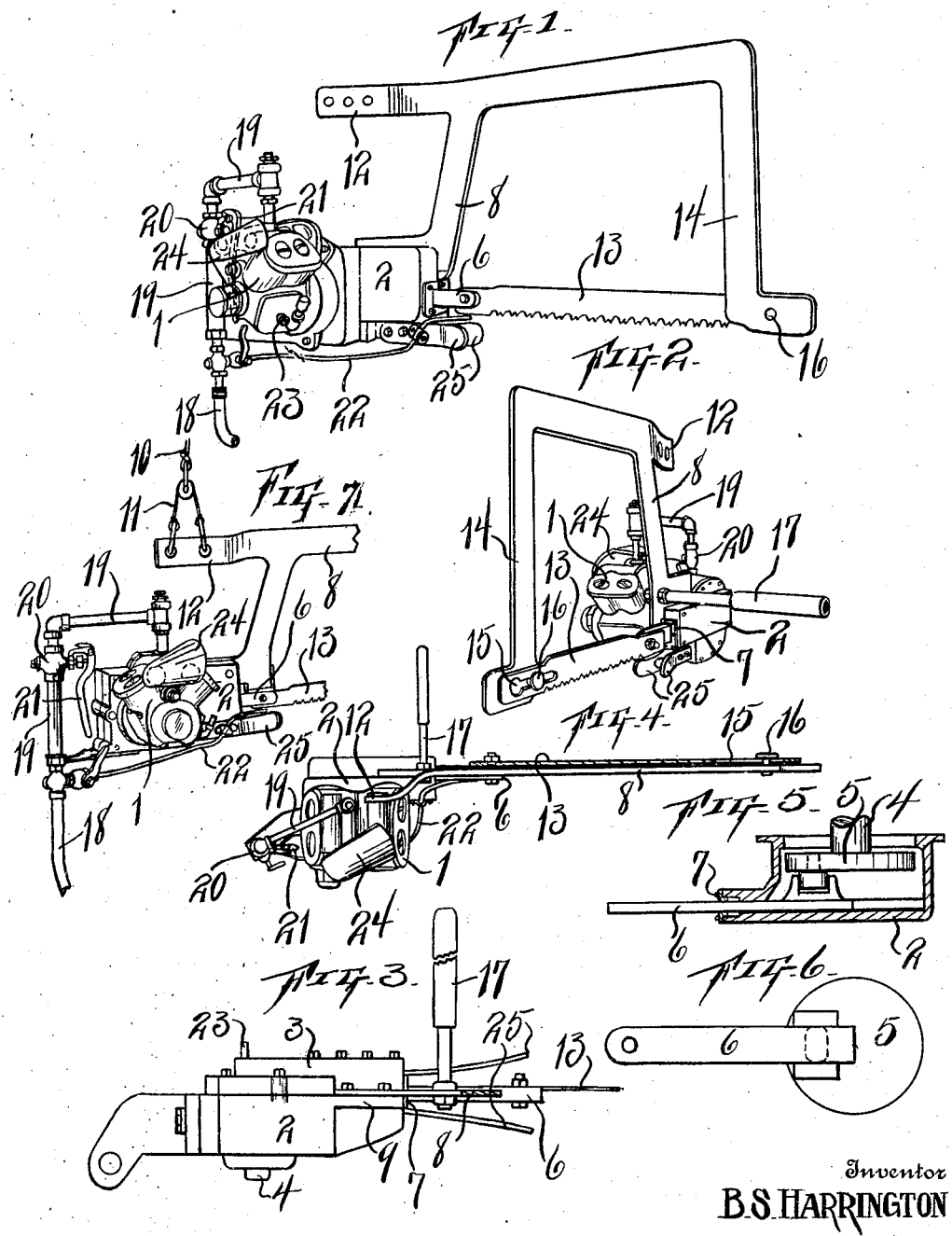
Inventor
B.S. HARRINGTON
By A. D. Jackson
Attorney Patented Mar. 25, 1930

1,752,257

UNITED STATES PATENT OFFICE

BERTIE S. HARRINGTON, OF FORT WORTH, TEXAS, ASSIGNOR TO WOLF MACHINE COMPANY, OF CINCINNATI, OHIO, A CORPORATION OF OHIO

CARCASS SPLITTER

Application filed January 11, 1928. Serial No. 245,975.

My invention relates to carcass splitting machines and more particularly to machines operated by compressed air; and the object is to provide machines for splitting carcasses in a practical and economical manner and to provide machines in which the saw is arranged or off-set relative to the motor so that the operator can see the operation of a saw directly without obstruction thereby obtaining better vision and control and a balancing of the machine.

All moving parts are completely inclosed and running in oil bath and no damage can result from water, blood or dust as the machine is sealed against such elements.

The necessary sanitary conditions on killing floors are easily met since a dip in hot water cleanses the machine perfectly and will not damage the machine. The machine may also be cleansed with a hose.

No cross-head for the saw is used. A Scotch yoke is used and its arm extends out of the casing through a packing box and the saw blade is bolted thereto. Consequently no blood or bone dust can enter the housing to cause unsanitary conditions and gear trouble.

An M tooth saw is used and this saw cuts going each way and has large deep pockets between the teeth to bring out the dust and to prevent clogging.

The saw is supported entirely by an arm of the Scotch yoke which extends out of the housing through a stuffing box and has no rear end support other than the Scotch yoke. The front end is slotted and runs on a hardened roller to lessen friction, and consequently less power is required and unsanitary pockets for meat and blood are eliminated.

New sharp blades are often needed and the change can be quickly made because of the simplicity of the saw connection and support.

The saw is cleaned with an air blast often after the cutting of each carcass or can be set so that it clears and blows dust and blood and flesh downwardly all the time the saw is running, thus aiding in sanitation and cleaner operation. In hot climates this work is very trying on the operator. In such cases, the motor exhaust is very cool and may be directed towards the operator so that he can be much more comfortable.

The motor is mounted with its axis horizontal and at right angles to the travel of the saw. It has a perfectly balanced fly-wheel, no counterbalancing being required. This gives the best gyroscopic effect for perfect balancing of the saw.

The little necessary vibration in the saw is vertical, the same direction the saw is cutting. This arrangement facilitates the cutting and keeps the machine steady from all lateral vibration.

The air motor is safe under all conditions. Where electric motors are used, the operators are liable to get uncomfortable and dangerous shocks because of the water on the killing floors.

The saw starts and stops quickly and more easily and with less wear and tear than electrically operated saws and there is no burning of contacts and constant operation of the air valves does not cause any trouble and tends to a better control and greater safety.

Carcass splitting requires different speeds and the machine has any speed required. It has a slow careful start, the speed unlimited in the middle, and then taken off with a perfect finish.

The machine is constructed throughout with bolts running entirely through and there are no weak threads in soft metal.

In this machine a more perfect balancing is obtained by a double connection support to the frame and a sheave wheel above the main supporting cable, allowing the machine to be more easily inclined in either direction vertically.

Reference is had to the accompanying drawings which form a part of this application.

Fig. 1 is a perspective side elevation of the machine.

Fig. 2 is a perspective side elevation, showing the opposite side from that shown in Fig. 1.

Fig. 3 is a plan view of the machine with the upper part of the saw frame omitted, and shown without the motor.

Fig. 4 is a plan view of the machine on a smaller scale.

Fig. 5 is a plan view of the saw drive and its gearing, the casing being shown with the upper part omitted.

Fig. 6 is a side elevation of the same.

Fig. 7 is a perspective view, being a side elevation.

Similar characters of reference are used to indicate the same parts throughout the several views.

This machine is provided with an air motor of suitable design and need not be described. The motor is indicated generally by the character 1. A casing 2 for the saw drive is connected to the motor casing by suitable bolts. One side 3 of the casing 2 is removable. The motor 1 is provided with a shaft 4 which it drives, and a disk 5 is rigid with the shaft 4. A pitman bar or Scotch yoke 6 is operatively connected to the disk 5 and is driven by the disk 5. This pitman bar or Scotch yoke as is well known in the art comprises either a slotted bar or a bar having a groove at one end adapted for connection to a crank pin or roller by means of which it is actuated. As will be seen from Fig. 6 the roller on disc 5 functions as a crank pin and partakes of an elliptical path in the track or groove of the Scotch yoke, as indicated by dotted lines, thus causing the pitman bar or yoke to reciprocate as the disc rotates on shaft 4. The pitman bar 6 reciprocates through the forward end of the casing 2 and a packing gland 7 prevents bone dust and blood and other matter from entering the casing 2. The machine is provided with a carrying frame 8 which is bolted to a flange 9 of the casing 2. The frame 8 is suspended by means of a cable 10 and a double support 11 which is adjustable. The supporting arm 12 which is located approximately above the center of mass of the structure (see Figs. 2 and 4) is curved in order to off-set the saw carrying frame relative to the motor 1 and other parts so that the operator can look lineally along the saw to the carcass. Thus there is nothing to obstruct the vision of the operator. A saw blade or other suitable cutter 13 is bolted directly to the Scotch yoke 6 and needs no rear support and is driven by the Scotch yoke. The blade is connected to the front part 14 of the blade carrying frame by means of a slot 15 in the blade and the blade runs on a steel roller 16 which is carried by the frame member 14. The blade 13 reciprocates on this roller 16. It will be observed that the blade is thus supported at its outer end by the roller 16, and at its inner end by the Scotch yoke or pitman bar 6.

The machine is provided with a guide handle 17 which is rigid with the supporting frame 8. The machine is suspended by means of the cable 10 so that the operator can readily guide the machine by means of the handle 17.

The motor 1 is provided with an air supply hose or pipe 18 which is connected to a pipe 19 which is provided with a throttle valve 20. The pipe 19 is operatively connected to the motor 1 and a starting lever 21 is provided for turning in the air. More or less air can be turned into the motor by the lever 21 to obtain different speeds. The operator stands holding the handle 17 in one hand and has the other hand on the starting lever 21. A pipe 22 may be connected to the supply pipe 18 for directing blasts of air on the saw to clean it of bone dust and blood.

The motor 1 is provided with a connection 23 for grease guns for lubricating the working parts. A deflector 24 is connected to the motor 1 to throw the escaping air back on the operator should he need it to keep cool. It can be seen from Figs. 1 and 7, that this deflector is positioned adjacent the exhaust ports of the motor 1, and is adjustably mounted on the motor by means of a nut and bolt connection.

Guards 25 are attached to the casing 2 to keep the machine from going too close to the carcass which is being split. The guards 25 simply bear against the carcass as the sawing progresses downwardly.

What I claim is:—

1. A carcass splitting machine, comprising a motor, a reciprocating cutter blade operatively connected to said motor, a supporting frame operatively connected to the motor housing, means engageable with said frame to suspend the same, said frame having a portion offset laterally from the motor housing and the suspension means, whereby to position the blade in sight of the operator, and means carried by said off-set portion for guiding said blade.

2. A carcass splitting machine comprising a motor, a reciprocating blade, a Scotch yoke operatively connecting said blade to said motor, a supporting frame attached to the motor housing and provided with a guide for said blade, said blade being supported at one end solely by said Scotch yoke and at the other end by said guide.

3. A carcass splitting machine comprising a motor, a reciprocating blade, a Scotch yoke operatively connecting said blade to said motor, a supporting frame attached to the motor housing, means to suspend the frame, said frame being provided with a guide for said blade, said blade being supported at one end solely by said Scotch yoke and at the other end by said guide, said frame comprising two spaced portions, one located above the center of mass of said motor and the other located at one side of said motor and carrying said guide whereby to position the blade in sight of the operator.

4. A cutting machine comprising a motor, a reciprocating blade and means operatively connecting said blade to said motor, a supporting frame attached to the motor housing and provided with a guide for said blade, said blade being supported at one end solely by said connecting means, and at the other end by said guide.

5. A cutting machine comprising a motor, a reciprocating blade, and means operatively connecting said blade to said motor, a supporting frame attached to the motor housing, means to suspend the frame, said frame being provided with a guide for the blade, and said blade being supported at one end solely by said connecting means and at the other end by said guide, said frame comprising two spaced portions, one located above the center of mass of said motor and the other located at one side of said motor and carrying said guide, whereby to position the blade in sight of the operator.

In testimony whereof, I set my hand, this 9th day of January, 1928.

BERTIE S. HARRINGTON.